(12) United States Patent
Ueki et al.

(10) Patent No.: US 7,344,803 B2
(45) Date of Patent: Mar. 18, 2008

(54) ALKALINE PRIMARY BATTERY

(75) Inventors: Shinichi Ueki, Shizuoka (JP); Yoshiro Harada, Shizuoka (JP); Mitsuhiro Nakamura, Shizuoka (JP); Hiroto Sagisaka, Shizuoka (JP); Takeshi Miyazaki, Shizuoka (JP)

(73) Assignees: FDK Corporation, Tokyo (JP); Tanaka Chemical Corporation, Fukui-Ken (JP)

( * ) Notice: Subject to any disclaimer, the term of this patent is extended or adjusted under 35 U.S.C. 154(b) by 667 days.

(21) Appl. No.: 10/469,472

(22) PCT Filed: Feb. 26, 2002

(86) PCT No.: PCT/JP02/01742

§ 371 (c)(1),
(2), (4) Date: Jan. 8, 2004

(87) PCT Pub. No.: WO02/069420

PCT Pub. Date: Sep. 6, 2002

(65) Prior Publication Data

US 2004/0115531 A1    Jun. 17, 2004

(30) Foreign Application Priority Data

Feb. 26, 2001 (JP) .............................. 2001-051065

(51) Int. Cl.
*H01M 4/32* (2006.01)
*H01M 4/52* (2006.01)
*H01M 4/58* (2006.01)

(52) U.S. Cl. ...................... 429/223; 429/165; 429/229

(58) Field of Classification Search ............. 429/218.1, 429/223, 229
See application file for complete search history.

(56) References Cited

U.S. PATENT DOCUMENTS 6,333,126 B2 * 12/2001 Maruta ...................... 429/223

FOREIGN PATENT DOCUMENTS

JP    11-130441    *  5/1999
JP    2002-3223       1/2002

(Continued)

OTHER PUBLICATIONS

Sasaki et al., "Modification of Nickel Oxyhydroxide Positive Active Materials for 3 Volt-Class Secondary Cells," GS News Technical Report (2001), 60(1), 12-16.*

(Continued)

*Primary Examiner*—Jonathan Crepeau
*Assistant Examiner*—Robert Hodge
(74) *Attorney, Agent, or Firm*—Harness, Dickey & Pierce, PLC

(57) ABSTRACT

An alkaline primary cell which is improved in reduction of self-discharge and cell capacity under storage at a high temperature, has a prolonged life and makes use of nickel oxyhydroxide is provided inexpensively. β-Form nickel oxyhydroxide is contained in a positive electrode mixture as an active material, which contains cobalt and zinc as a substitutional element for solid solution, and has a total amount $X+Y$ of molar ratios of cobalt atom $X$ and zinc atom $Y$ such that $2 \leq X+Y \leq 16$, with a mixing ratio satisfying the relationship of $Y \leq 3/2 \times X + 1/2$ and $Y \geq 2/3 \times X - 1/3$, and where a diffraction peak obtained as a result of measurement of X-ray powder diffraction of nickel oxyhydroxide appears only in the vicinity of 18.5° within a range of $2\theta=10°-30°$.

4 Claims, 3 Drawing Sheets

FOREIGN PATENT DOCUMENTS

| | | |
|---|---|---|
| JP | 2002-75354 | 3/2002 |
| JP | 2002-179427 | 6/2002 |
| JP | 2002-203546 | 7/2002 |

OTHER PUBLICATIONS

International Search Report for International Applicaion No. PCT/JP02/01742 established and mailed on Jun. 4, 2002; ISA/JPO.

* cited by examiner

ALKALINE PRIMARY BATTERY

TECHNICAL FIELD

The present invention relates to an alkaline primary cell having nickel oxyhydroxide to which at least cobalt and zinc alone are added as an active material for positive electrode to a positive electrode mixture for use as a solid solution substitutional element and more particularly, to an alkaline primary cell which is improved in discharge characteristics under high load and also in self-discharge characteristics under storage at high temperatures.

BACKGROUND ART

At present, alkaline manganese cells are now in main use as an alkaline primary cell having high output characteristics, in which manganese dioxide is used as a positive electrode active material and zinc is used as a negative electrode active material, with an alkaline aqueous solution being employed as an electrolytic solution. In recent years, as portable appliances including digital cameras, information communication terminals and the like are becoming high in performance, there is an increasing demand for further improvement in high load characteristics and also for high capacity in respect to alkaline manganese cells which are used as a power source.

As a means which is capable of providing a cell having excellent output characteristics in order to meet such a demand as mentioned above, attention has been long paid to application of nickel oxyhydroxide as a positive electrode active material, and studies have been, in fact, made thereon (see Japanese Patent Application Laid-open Publication Nos. Sho 53-32347 and Sho 55-30133).

However, hitherto studied cells using nickel oxyhydroxide as a positive electrode active material have the problem that when the cells are left over a long time under high temperature conditions, the cell capacity decreases owing to self-discharge thereof, and thus have never been put into practice. In particular, with primary cells, the reduction in capacity resulting from self-discharge means a loss of function as a cell. Thus, it is essential to overcome the problem on the reduction of capacity ascribed to self-discharge in order to realize the practical use.

DISCLOSURE OF THE INVENTION

The invention has been accomplished under these circumstances and has an object to provide an alkaline primary cell which overcomes the problem on the self-discharge caused during storage under high temperature conditions with an accompanying problem on the reduction in cell capacity, and which is capable of being stored over a long time with a prolonged life and makes use of nickel oxyhydroxide.

In order to achieve the above object, an alkaline primary cell according to one embodiment of the invention comprises a positive electrode mixture including nickel oxyhydroxide in which cobalt and zinc alone used at least as an active material for positive electrode for use as a solid solution substitutional element, wherein, the nickel oxyhydroxide, a general formula of which being $Ni_{1-x-y}Co_xZn_yOOH$, has the following total amount X+Y of molar ratios of cobalt atom and zinc atom when the molar ratio of cobalt is represented by X and the molar ratio of zinc is represented by Y 2 mole % $\leq$ X+Y $\leq$ 16 mole %, the molar ratio X of cobalt and the molar ratio Y of zinc, both serving as a solid solution substitutional element, satisfy the following relationship $Y \leq 3/2 \times X + 1/2$ $Y \geq 2/3 \times X - 1/3$, and a diffraction peak obtained as a result of measurement of X-ray powder diffraction of the nickel oxyhydroxide appears only in the vicinity of 18.5° within a range of 2θ=10°-30°.

An alkaline primary cell according to a preferred embodiment of the invention comprises a positive electrode mixture including nickel oxyhydroxide in which cobalt and zinc alone used at least as an active material for positive electrode for use as a solid solution substitutional element, wherein, the nickel oxyhydroxide, a general formula of which being $Ni_{1-x-y}Co_xZn_yOOH$, has the following total amount X+Y of molar ratios of cobalt atom and zinc atom when the molar ratio of cobalt is represented by X and the molar ratio of zinc is represented by Y 4 mole % $\leq$ X+Y $\leq$ 14 mole %, the molar ratio X of cobalt and the molar ratio Y of zinc, both serving as a solid solution substitutional element, satisfy the following relationship, $0.4 \leq X/(X+Y) \leq 0.6$, and a diffraction peak obtained as a result of measurement of X-ray powder diffraction of the nickel oxyhydroxide appears only in the vicinity of 18.5° within a range of 2θ=10°-30°.

The alkaline primary cell according to another embodiment of the invention is characterized in that a molded article of the positive electrode active material is formed as a hollow cylinder, and a negative electrode active material is arranged at the center of the molded article of the positive electrode active material with a separator put between the negative electrode active material and the molded article thereby structuring an inside out type cell.

The invention is described in more detail below.

The present inventors have made studies and developments on solid solution substitutional species contained in crystals, solid solution compositions, and cell arrangements in order to improve self-discharge reaction of nickel oxyhydroxide, and many experiments have been conducted to obtain the following information, thus arriving at completion of the invention.

===Molar Ratios of Cobalt and Zinc===

It has been found that the reduction in capacity ascribed to self-discharge of nickel oxyhydroxide can be mitigated when cobalt and zinc alone are added as solid solution substitutional species, to crystals and the ratio of cobalt and zinc satisfy the following relationship $Y \leq 3/2 \times X + 1/2$ $Y \geq 2/3 \times X - 1/3$ (wherein X: the number of cobalt atoms, and Y: the number of zinc atoms).

Further, it has also been found that when the molar ratios of cobalt atom and zinc atom satisfy the following relationship, $0.4 \leq X/(X+Y) \leq 0.6$ the effect of improving the self-discharge characteristics becomes more apparent.

===Total Amount of Solid Solution Substitutional Elements===

Where the total amount X+Y in substitutional solid solution of cobalt and zinc is lower than 2 mole %, the improving effect of self-discharge becomes low and is thus unsuitable. Where the total amount X+Y of cobalt and zinc is larger than 16 mole %, the cell capacity is unsuitably lowered in association with the lowering in utilization rate of nickel oxyhydroxide.

Accordingly, the total amount X+Y in substitutional solid solution of cobalt atom and zinc atom contained in nickel oxyhydroxide should preferably be not less than 2 mole % and not larger than 16 mole % (2 mole %≦X+Y≦16 mole %). The above effect is more significantly improved when the total amount X+Y substitutional solid solution is more than 4 mole % and less than 14 mole % (4 mole %≦X+Y≦14 mole %).

===Cell Arrangement===

In general, the cylindrical cell can be generally classified into an inside out type and a spiral type. The inside out type has such an arrangement that a negative electrode active material is disposed through a separator at the center of a molded article of a positive electrode active material in the form of a hollow cylinder. The spiral type has a configuration where a layer built sheet structured by a sheet-shaped positive electrode placed in face-to-face relation with a sheet-shaped negative electrode through a separator is convolutely wound and inserted into a cell casing.

With the spiral type, it is necessary to use a current collecting substrate for structuring the sheet-shaped positive and negative electrode active materials. The use of current collecting substrates other than the active materials within a cell may invite a lowering in amount of active materials to be charged inside the cell having a limited capacity, and is thus unfavorable from the standpoint of capacity. The foamed nickel mesh and the like that is ordinarily employed as a current collecting substrate is very expensive, thereby causing cell costs to be increased.

From the standpoint of capacity and cost, the inside out type is desirable for cell arrangement.

===Problems in a Case Using Nickel Hydroxide as an Active Material===

Generally, nickel hydroxide that serves as a positive electrode active material of nickel hydrogen secondary batteries, nickel cadmium secondary batteries and the like can be converted to nickel oxyhydroxide by electrochemical oxidation. However, the cell arrangement of the inside out type makes it difficult to ensure a good current collecting condition. Accordingly, when an attempt has been made where nickel hydroxide is electrochemically oxidized while keeping the cell arrangement of the inside out type, a failure in current collection may occur within the active material for positive electrode partly due to the influence that the electric conductivity of nickel hydroxide is low. In this way, a difficulty is involved in satisfactorily producing nickel oxyhydroxide throughout the positive electrode, thereby causing the cell capacity to lower.

In a case where electrochemical oxidation is carried out excessively so as to increase the amount of formation of nickel oxyhydroxide, nickel oxyhydroxide in an excessively oxidized condition (hereinafter referred to as γ-form nickel oxyhydroxide) is formed along with β-form nickel oxyhydroxide which is assumed to be inherently formed.

This γ-form nickel oxyhydroxide has a wider interlayer distance than β-form nickel oxyhydroxide and causes the volumetric expansion of positive electrode active material to be induced in association with the formation of γ-form nickel oxyhydroxide. As a consequence, leakage takes place, thus presenting a problem on safety.

Moreover, γ-form nickel oxyhydroxide exhibits great absorptivity of electrolytic solution, so that the formation of this compound constitutes a factor of causing shortage of electrolytic solution in the cell.

Accordingly, to maintain a good cell condition, mixing of γ-form nickel oxyhydroxide is not favorable.

Thus, in the cell arrangement of the inside out type, it is not preferred to provide an active material by electrochemically oxidizing nickel hydroxide into nickel oxyhydroxide.

===Detection of γ-Form Nickel Oxyhydroxide===

The presence or absence of a γ-phase in nickel oxyhydroxide can be confirmed by X-ray powder diffraction measurement as shown in FIG. 1. With β-form nickel oxyhydroxide, one diffraction spectrum is observed in the vicinity of 18° within a range of 10-30° as a result of X-ray powder diffraction. On the other hand, if γ-form nickel oxyhydroxide exists, two peaks are observed in the vicinity of 12.5° and 25.5°, respectively. Thus, the presence or absence of γ-form nickel oxyhydroxide can be confirmed through the presence or absence of the peaks in the vicinity of 12.5° and at 25.5°.

It will be noted that the presence or absence of a γ phase in nickel oxyhydroxide may also be determined by measurement of acidity. If the acidity of nickel oxyhydroxide is larger than 3.0, a γ-form nickel oxyhydroxide phase exists. In this sense, the acidity of nickel oxyhydroxide used as an active material should preferably be at 3.0 or below. If the acidity is lower than 2.8, then oxidation into nickel oxyhydroxide is unsatisfactory, thereby causing the utilization rate as a cell active material to lower. Thus, the acidity of nickel oxyhydroxide should preferably be from 2.8 to 3.0.

===Method of Using β-form Nickel Oxyhydroxide Alone as an Active Material===

The problem of mixing such γ-form nickel oxyhydroxide in a positive electrode can be avoided when using, as an active material, nickel oxyhydroxide prepared by chemically oxidizing nickel hydroxide beforehand. That is, the use of nickel oxyhydroxide prepared beforehand by chemical oxidation of nickel hydroxide enables one to obtain, in a positive electrode, a single phase of γ-form nickel oxyhydroxide-free β-form nickel oxyhydroxide.

===Chemical Oxidation Method===

The chemical oxidation into nickel oxyhydroxide is feasible by adding an oxidizing agent such as sodium hypochlorite to an alkaline aqueous solution of nickel hydroxide being agitated and mixed.

The oxidizing agent is not limited to sodium hypochlorite, but all compounds capable of converting nickel hydroxide into β-form nickel oxyhydroxide is usable.

===Summary===

The alkaline primary cell comprising, in a positive electrode mixture, single phase, β-form nickel oxyhydroxide which contains cobalt and zinc alone as a substitutional solid solution species and in which a total amount X+Y where X is a molar ratio of cobalt atom and Y is a molar ratio of zinc atom is such that 2 mole %≦X+Y≦16 mole % and a mixing ratio satisfies the following relationship

Y≦3/2×X+1/2

Y≧2/3×X−1/3 suffers a reduced degree of degradation when stored at high temperature over a long time, ensures a large capacity and can be provided at low costs.

It is preferred from the standpoint of realizing large capacity that the β-form nickel oxyhydroxide has such a total amount of X+Y that 4 mole %≦X+Y≦14 mole % and a mixing ratio satisfying the following relationship:

$$0.4 \leq X/(X+Y) \leq 0.6$$

The cell is so arranged as to be of an inside out type where the positive electrode mixture is inserted into a positive electrode can as a molded article of a hollow cylinder and a negative electrode active material is placed in the central portion of the cylinder with a separator put between the negative electrode active material and the molded article, thus realizing low cost.

BEST MODE FOR CARRYING OUT THE INVENTION

Preferred embodiments of an alkaline primary cell according to the invention will be described with reference to the accompanying drawings.

First, conditions of preparing nickel oxyhydroxide containing cobalt and zinc alone as a substitutional solid solution species, fabrication of cells for evaluation and characteristic evaluation testing conditions are set forth below.

===Fabrication of Positive Electrode===

A sodium hydroxide aqueous solution was added to and agitated in a reaction vessel in which 1000 ml of a mixed solution of nickel sulfate, cobalt sulfate and zinc sulfate having nickel, cobalt and zinc at given atomic ratios, respectively, was maintained at 30° C. After agitation for about 1 hour, the resultant precipitate was filtered out and washed with water. After the washing, the sample was vacuum dried at a normal temperature.

Next, 100 g of the resulting powder was added to 10 moles/liter of a sodium hydroxide aqueous solution and agitated, followed by keeping the solution temperature at 30° C. to 60° C. While agitating the solution, 500 ml of a 10 wt % sodium hypochlorite aqueous solution was added to and agitated for about 1 hour. The resulting precipitate was removed by filtration and washed with water, followed by vacuum drying at a temperature of 60° C. or below.

One hundred wt % of nickel oxyhydroxide containing only the cobalt and zinc obtained by the above procedure as a substitutional solid solution species, 10 wt % of graphite powder and 5 wt % of a potassium hydroxide aqueous solution were mixed to prepare a mixture, followed by pressing to provide a hollow cylinder for use as a positive electrode.

===Fabrication of Negative Electrode===

One wt % of an acrylic resin was added to 60 wt % of a zinc powder provided as a negative electrode active material and 40 wt % of a potassium hydroxide aqueous solution containing zinc oxide to saturation to provide gelled zinc for use as a negative electrode.

===Fabrication of Cell===

Figure 1:
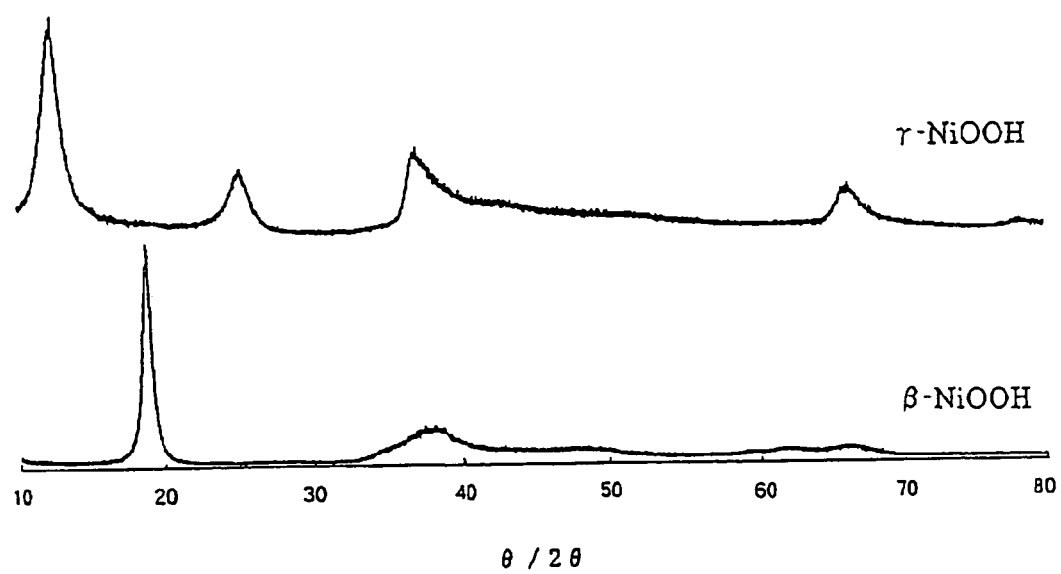
FIG. 1 is a view showing the respective X-ray powder diffraction (XRD) patterns of γ-form nickel oxyhydroxide and β-form nickel oxyhydroxide used in the present invention.
Figure 2:
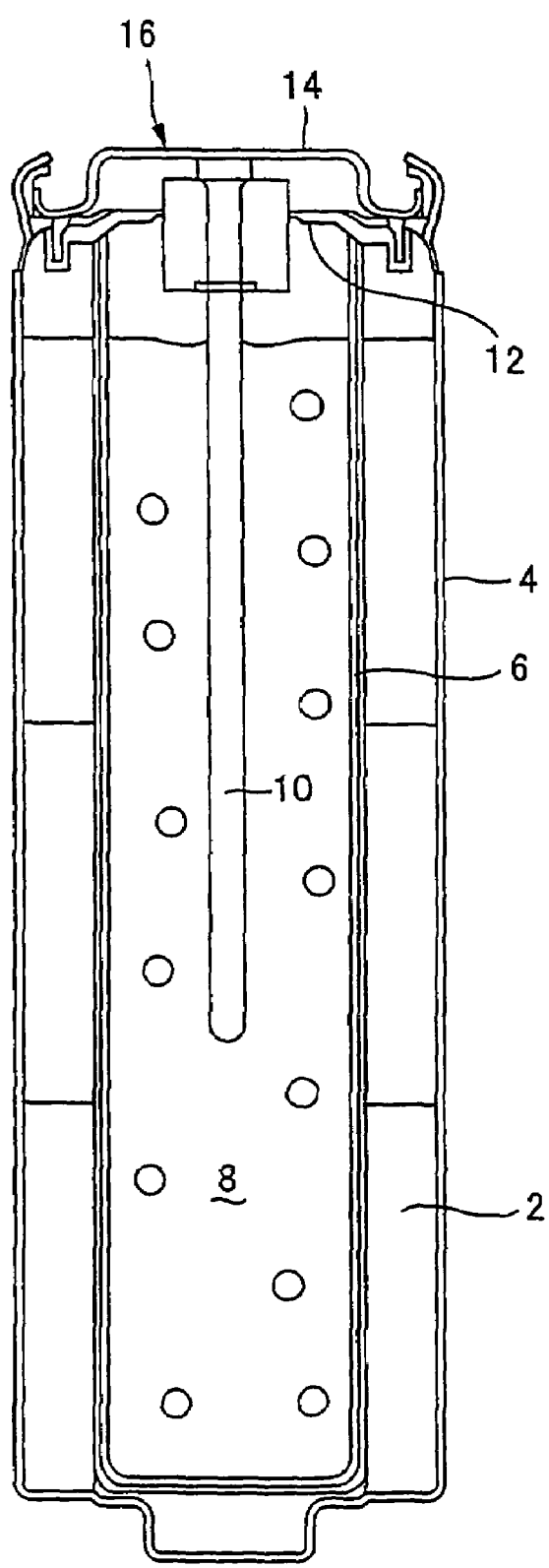
FIG. 2 is a longitudinal sectional view of an alkaline primary cell according to the invention.
Figure 3:
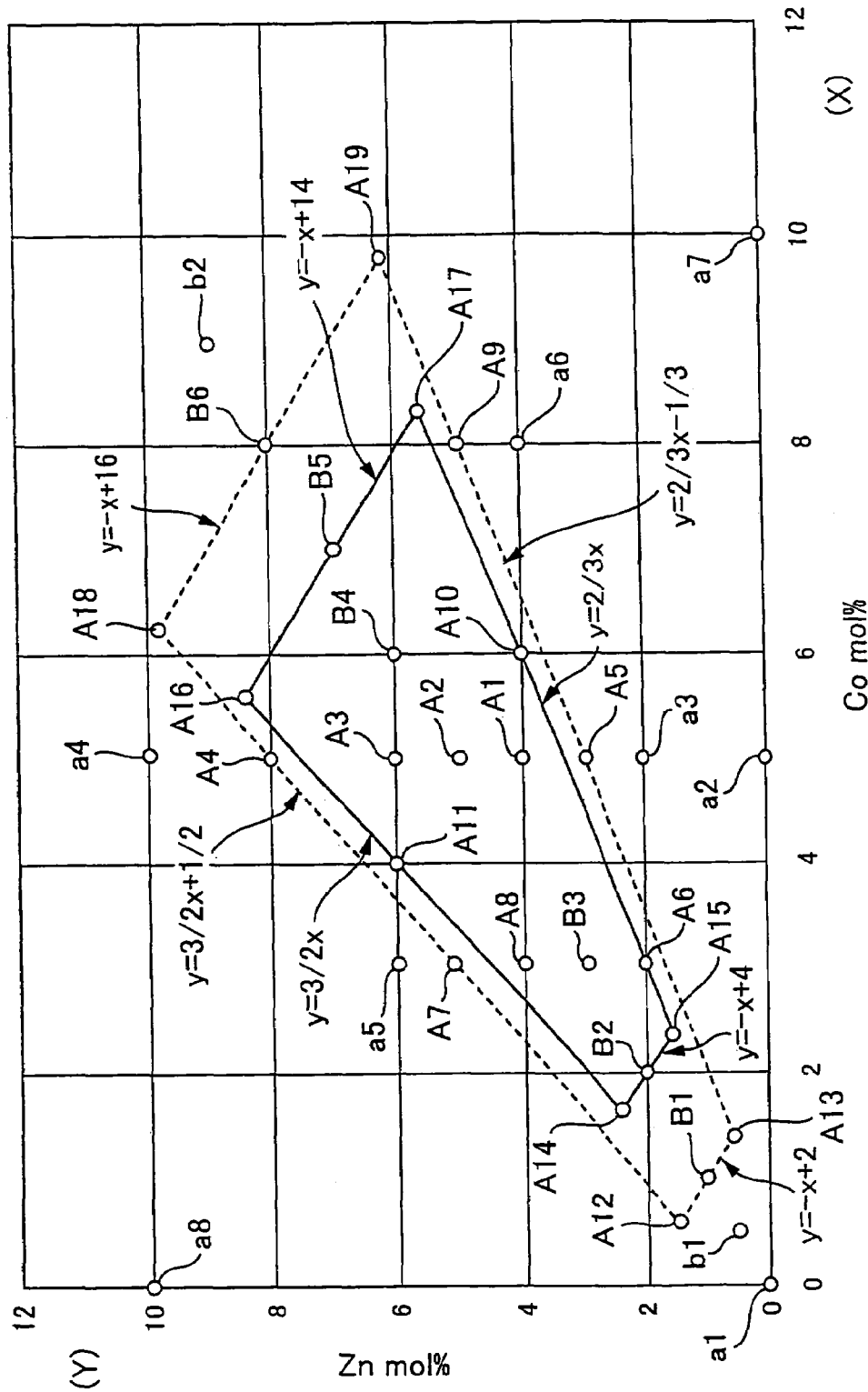
FIG. 3 is a graph showing suitability concerning capacity retention rates of alkaline primary cells of different types where cobalt and zinc are formulated in nickel oxyhydroxide in different ratios with respect to the substitutional amount in solid solution of cobalt in nickel oxyhydroxide and the substitutional amount in solid solution of zinc in nickel oxyhydroxide.

As shown in FIG. 3, the above positive electrode molding 2 is inserted in contact within a cell can 4 in the form of a hollow cylinder with a bottom, and a separator 6 made of a polypropylene non-woven fabric processed in the form of a cylinder is placed on the inner side of the positive electrode molding 2, followed by placing a negative electrode 8 at the central portion inside the separator 6.

The opening of the cell can 4 was hermetically sealed by use of a terminal 16 for the negative electrode which was made integrally of a current collector 10, a gasket 12 and a negative electrode cover 14, thereby obtaining an intended cell.

===Evaluation Test of Storage Characteristics===

Ten cells for each of the formulations where mixing ratios of the respective positive electrode active materials were taken as X mole % of cobalt and Y mole % of zinc were widely changed, and fabricated. Five cells among them were discharged to 0.9 V through 1 W constant power discharge immediately after the fabrication and an average value of discharge duration times of the respective cells was calculated to provide an initial discharge duration time.

The other five cells among the pre-production samples were stored at 60° C. for 20 days, after which they were allowed to be discharged to 0.9 V through 1 W constant power discharge, and an average value of discharge duration times of the respective cells was calculated to provide a discharge duration time after the storage.

For the value indicating a characteristic degradation after storage of the cell, a value of capacity retention rate was defined according to the following equation for comparison.

Capacity retention rate=(discharge duration time after storage×100)/initial discharge duration time Tables 1 and 2 show the correlation of the alkaline primary cells having different mixing ratios between the substitutional amount in solid solution of cobalt and the substitutional amount in solid solution of zinc in nickel oxyhydroxide in relation to the capacity retention rate thereof. FIG. 3 is a graph obtained by plotting the results of Tables 1 and 2 and showing a range of acceptance or rejection. As will be apparent from these Tables 1 and 2 and the graph of FIG. 3, with Examples A1 to A19 and B1 to B6 where the total amount X+Y where the substitutional amount in solid solution of cobalt atom is taken as X mole % and the substitutional amount in solid solution of zinc atom is taken as Y mole % is within a range of 2 mole %≦X+Y≦16 mole % and the mixing ratio is such that Y≦3/2×X+1/2 and Y≧2/3×X−1/3, the capacity retention rate can be kept at 60% or over. In contrast, with Comparative Examples a1, b1 and b2 where the total amount X+Y is outside the above range and also with Comparative examples a2 to a8 and b1 to b2 where the above-defined mixing ratio does not satisfy the requirement of {(2/3×X−1/3)≦Y≦(3/2×X+1/2)}, the capacity retention rate is less than 60%.

With the case where the total amount X+Y is within a range of 4 mole % ≦ X+Y ≦ 14 mole % and the mixing molar ratio between cobalt atom and zinc atom satisfies the relation of 0.4 ≦ X/(X+Y) ≦ 0.6 (Examples A1, A2, A3, A6, A8, A10, A11, A14, A15, A16, A17, B2, B3, B4 and B5), the capacity retention rate reaches 69% or more and is thus remarkably improved.

substitution in solid solution, revealed that in order to reduce self-discharge under storage at high temperature, it was preferable to use an active material having a specific surface area of 30 $m^2/g$ or less. More specifically, with respect to nickel oxyhydroxide where the substitutional amounts in solid solution of cobalt and zinc were, respectively, 5 mole %, the specific surface area was set at three levels of 35 $m^2/g$

TABLE 1

| | Substitutional amount in solid solution of cobalt X/mole % | Substitutional amount in solid solution of zinc Y/mole % | X + Y | X/(X + Y) | Capacity Retention Rate | Utilization Rate | Judgment |
|---|---|---|---|---|---|---|---|
| Example A1 | 5 | 4 | 9 | 0.56 | 74 | 90 | ⊙ |
| Example A2 | 5 | 5 | 10 | 0.5 | 75 | 90 | ⊙ |
| Example A3 | 5 | 6 | 11 | 0.45 | 70 | 87 | ⊙ |
| Example A4 | 5 | 8 | 13 | 0.38 | 65 | 83 | ○ |
| Example A5 | 5 | 3 | 8 | 0.63 | 63 | 89 | ○ |
| Example A6 | 3 | 2 | 5 | 0.6 | 69 | 93 | ⊙ |
| Example A7 | 3 | 5 | 8 | 0.38 | 66 | 90 | ○ |
| Example A8 | 3 | 4 | 7 | 0.43 | 71 | 91 | ⊙ |
| Example A9 | 8 | 5 | 13 | 0.62 | 62 | 84 | ○ |
| Example A10 | 6 | 4 | 10 | 0.6 | 69 | 90 | ⊙ |
| Example A11 | 4 | 6 | 10 | 0.4 | 70 | 85 | ⊙ |
| Example A12 | 0.6 | 1.4 | 2 | 0.3 | 64 | 99 | ○ |
| Example A13 | 1.4 | 0.6 | 2 | 0.7 | 61 | 99 | ○ |
| Example A14 | 6.2 | 9.8 | 16 | 0.39 | 66 | 80 | ○ |
| Example A15 | 9.8 | 6.2 | 16 | 0.61 | 61 | 80 | ○ |
| Example A16 | 1.6 | 2.4 | 4 | 0.4 | 69 | 95 | ⊙ |
| Example A17 | 2.4 | 1.6 | 4 | 0.6 | 69 | 97 | ⊙ |
| Example A18 | 5.6 | 8.4 | 14 | 0.4 | 69 | 83 | ⊙ |
| Example A19 | 8.4 | 5.6 | 14 | 0.6 | 61 | 85 | ○ |
| Comparative example a1 | 0 | 0 | 0 | — | 40 | 100 | X |
| Comparative example a2 | 5 | 0 | 5 | 1 | 30 | 96 | X |
| Comparative example a3 | 5 | 2 | 7 | 0.71 | 45 | 93 | X |
| Comparative example a4 | 5 | 10 | 15 | 3 | 35 | 70 | X |
| Comparative example a5 | 3 | 6 | 9 | 3 | 43 | 85 | X |
| Comparative example a6 | 8 | 4 | 12 | 0.66 | 54 | 80 | X |
| Comparative example a7 | 10 | 0 | 10 | 1 | 48 | 70 | X |
| Comparative example a8 | 0 | 10 | 10 | 0 | 40 | 68 | X |

TABLE 2

| | Substitutional amount in solid solution of cobalt X/mole % | Substitutional amount in solid solution of zinc Y/mole % | X + Y | X/(X + Y) | Capacity Retention Rate | Utilization Rate | Judgment |
|---|---|---|---|---|---|---|---|
| Example B1 | 1 | 1 | 2 | 0.5 | 62 | 98 | ○ |
| Example B2 | 2 | 2 | 4 | 0.5 | 70 | 96 | ⊙ |
| Example B3 | 3 | 3 | 6 | 0.5 | 73 | 93 | ⊙ |
| Example B4 | 6 | 6 | 12 | 0.5 | 75 | 89 | ⊙ |
| Example B5 | 7 | 7 | 14 | 0.5 | 70 | 85 | ⊙ |
| Example B6 | 8 | 8 | 16 | 0.5 | 67 | 82 | ○ |
| Comparative example b1 | 0.5 | 0.5 | 1 | 0.5 | 45 | 99 | X |
| Comparative example b2 | 9 | 9 | 18 | 0.5 | 58 | 68 | X |

===Specific Surface Area===

The results of a study on the specific surface area of nickel oxyhydroxide where cobalt and zinc alone were subjected to (Example C1), 30 $m^2/g$ (Example C2), and 15 $m^2/g$ (Example C3), to compare the respective capacity retention rates, with the following results shown in Table 3. It was found that where the specific surface area was larger than 30 m²/g, the capacity retention rate under storage at a high temperature became lower than 70%, unfavorably resulting in increase of self-discharge. It will be noted that the specific surface area was measured according to the BET method.

TABLE 3

| | Substitutional amount in solid solution of cobalt X/mole % | Substitutional amount in solid solution of zinc Y/mole % | Specific surface area (m²/g) | Capacity retention rate (%) | Judgment |
|---|---|---|---|---|---|
| Example C1 | 5 | 5 | 35 | 60 | ○ |
| Example C2 | 5 | 5 | 30 | 70 | ◉ |
| Example C3 | 5 | 5 | 15 | 75 | ◉ |

===Mixing of Manganese Dioxide===

For a positive electrode active material, manganese dioxide that is ordinarily used as a positive electrode active material of an existing alkaline cell may be contained in addition to nickel oxyhydroxide.

More specifically, a product obtained by subjecting 5 mole % of cobalt and 5 mole % of zinc to substitutional solid solution treatment was provided as nickel oxyhydroxide, and the capacity retention rates and cell capacities of cells using 100% of the above nickel oxyhydroxide (Example D1), mixtures with manganese dioxide at mixing ratios of 75:25 (Example D2), 50:50 (Example D3) and 25:75 (Example D4), and 100% of manganese dioxide (Comparative Example d1) were compared with one another, with the results shown in Table 4 below. In Table 4, the cell capacity is indicated as a relative value in a case where the capacity of the cell using 100% of nickel oxyhydroxide is taken as 100. It will be noted that discharge conditions include 1 W constant power discharge and a final voltage is at 1 V.

As shown in Table 4, although the capacity retention rates are equal to one another for all the cases, the cell capacity reliably increases as the mixing ratio of nickel oxyhydroxide increases. Thus, addition of nickel oxyhydroxide to manganese dioxide permits the capacity of an alkaline primary cell to be reliably increased.

TABLE 4

| | Amount of NiOOH/wt % | Amount of MnO$_2$/wt % | Capacity retention rate | Cell capacity (relative value) |
|---|---|---|---|---|
| Example D1 | 100 | 0 | 75 | 100 |
| Example D2 | 75 | 25 | 75 | 88 |
| Example D3 | 50 | 50 | 75 | 78 |
| Example D4 | 25 | 75 | 75 | 68 |
| Comparative example d1 | 0 | 100 | 75 | 50 |

===Combination with Other Types of Metals===

As shown in Comparative Examples e1 to e13 shown in Tables 5, 6 and 7 below, combinations with other types of metals such as aluminum, titanium, calcium, magnesium aside from cobalt and zinc for use as a substitutional element for solid solution of nickel oxyhydroxide were checked, with the result that any of those combinations other than a combination of cobalt and zinc alone were not suitable because the capacity retention rate could not exceed 60%.

TABLE 5

| | Solid solution composition | Capacity retention rate | Utilization rate | Judgment |
|---|---|---|---|---|
| Comparative example e1 | Co 5 mol % + Al 5 mol % | 48 | 65 | X |
| Comparative example e2 | Co 5 mol % + Ti 5 mol % | 45 | 45 | X |
| Comparative example e3 | Co 5 mol % + Ca 5 mol % | 50 | 48 | X |
| Comparative example e4 | Co 5 mol % + Mg 5 mol % | 50 | 50 | X |

TABLE 6

| | Solid solution composition | Capacity retention rate | Utilization rate | Judgment |
|---|---|---|---|---|
| Comparative example e5 | Zn 5 mol % + Al 5 mol % | 45 | 50 | X |
| Comparative example e6 | Zn 5 mol % + Ti 5 mol % | 47 | 40 | X |
| Comparative example e7 | Zn 5 mol % + Ca 5 mol % | 48 | 45 | X |
| Comparative example e8 | Zn 5 mol % + Mg 5 mol % | 50 | 45 | X |

TABLE 7

| | Solid solution composition | Capacity retention rate | Utilization rate | Judgment |
|---|---|---|---|---|
| Comparative example e9 | Co 5 mol % + Zn 5 mol % + Al 5 mol % | 50 | 60 | X |
| Comparative example e10 | Co 5 mol % + Zn 5 mol % + Ti 5 mol % | 40 | 50 | X |
| Comparative example e11 | Co 5 mol % + Zn 5 mol % + Mn 5 mol % | 53 | 70 | X |
| Comparative example e12 | Co 5 mol % + Zn 5 mol % + Ca 5 mol % | 45 | 50 | X |
| Comparative example e13 | Co 5 mol % + Zn 5 mol % + Mg 5 mol % | 40 | 55 | X |

INDUSTRIAL APPLICABILITY

As having described in detail hereinabove, an alkaline primary cell of the present invention comprising, in a positive electrode mixture, single phase, β-form nickel oxyhydroxide which contains cobalt and zinc alone as a substitutional solid solution species and where a total amount X+Y in which a molar ratio of cobalt atom is taken as X and a molar ratio of zinc atom is taken as Y, such that $2 \leq X+Y \leq 16$, and a mixing ratio satisfies the following relationships $$Y \leq 3/2 \times X + 1/2$$

$$Y \geq 2/3 \times X - 1/3$$

exhibits a reduced degree of degradation caused by self-discharge when stored at high temperature over a long time, ensures a high capacity and can be provided at low costs.

More preferably, when the single phase, β-form nickel oxyhydroxide has a total amount X+Y of 4 mole %≦X+Y≦14 mole %, with the mixing ratio thereof satisfying the following relation $$0.4 \leq X/(X+Y) \leq 0.6$$

a more remarkably improved capacity and capacity retention rate can be realized.

Moreover, when the positive electrode mixture is provided as a molding of a hollow cylinder and inserted into a positive electrode case, and a negative electrode active material is arranged at the center of the molding with a separator put between the negative electrode active material and the molding to provide an inside out type of cell, lower costs can be realized.

What is claimed is:

1. An alkaline primary cell comprising a positive electrode mixture including nickel oxyhydroxide in which cobalt and zinc alone used at least as an active material for a positive electrode for use as a substitutional element for solid solution, wherein, said nickel oxyhydroxide, a general formula of which being $Ni_{1-x-y}Co_xZn_yOOH$, has the following total amount X+Y of molar ratios of cobalt atom and zinc atom when the molar ratio of cobalt is represented by X and the molar ratio of zinc is represented by Y 2 mole %≦X+Y≦16 mole %, the molar ratio X of cobalt and the molar ratio Y of zinc, both serving as a solid solution substitutional element, satisfy the following relationship $$Y \leq 3/2 \times X + 1/2$$

$$Y \geq 2/3 \times X - 1/3, \text{ and}$$

a diffraction peak obtained as a result of measurement of X-ray powder diffraction of said nickel oxyhydroxide appears only in the vicinity of 18.5° within a range of 2θ=10°-30°.

2. An alkaline primary cell comprising a positive electrode mixture including nickel oxyhydroxide in which cobalt and zinc alone used at least as an active material for positive electrode for use as a substitutional element for solid solution, wherein, said nickel oxyhydroxide, a general formula of which being $Ni_{1-x-y}Co_xZn_yOOH$, has the following total amount X+Y of molar ratios of cobalt atom and zinc atom when the molar ratio of cobalt is represented by X and the molar ratio of zinc is represented by Y 4 mole % ≦X+Y≦14 mole %, the molar ratio X of cobalt and the molar ratio Y of zinc, both serving as a solid solution substitutional element, satisfy the following relationship, $$0.4 \leq X/(X+Y) \leq 0.6, \text{ and}$$

a diffraction peak obtained as a result of measurement of X-ray powder diffraction of the nickel oxyhydroxide appears only in the vicinity of 18.5° within a range of 2θ=10°-30°.

3. An alkaline primary cell according to claim 1 wherein a molding of said positive electrode active material is formed as a hollow cylinder, and a negative electrode active material is arranged at the center of said molding of said positive electrode active material with a separator put between said molding and the negative electrode active material.

4. An alkaline primary cell according to claim 2, wherein a molding of said positive electrode active material is formed as a hollow cylinder, and a negative electrode active material is arranged at the center of said molding of said positive electrode active material with a separator put between said molding and the negative electrode active material.

* * * * *